No. 714,856. Patented Dec. 2, 1902.
R. BIRKHOLZ, Dec'd.
J. W. BIRKHOLZ, Administrator.
PRESS.
(Application filed Aug. 28, 1901.)

(No Model.) 5 Sheets—Sheet 1.

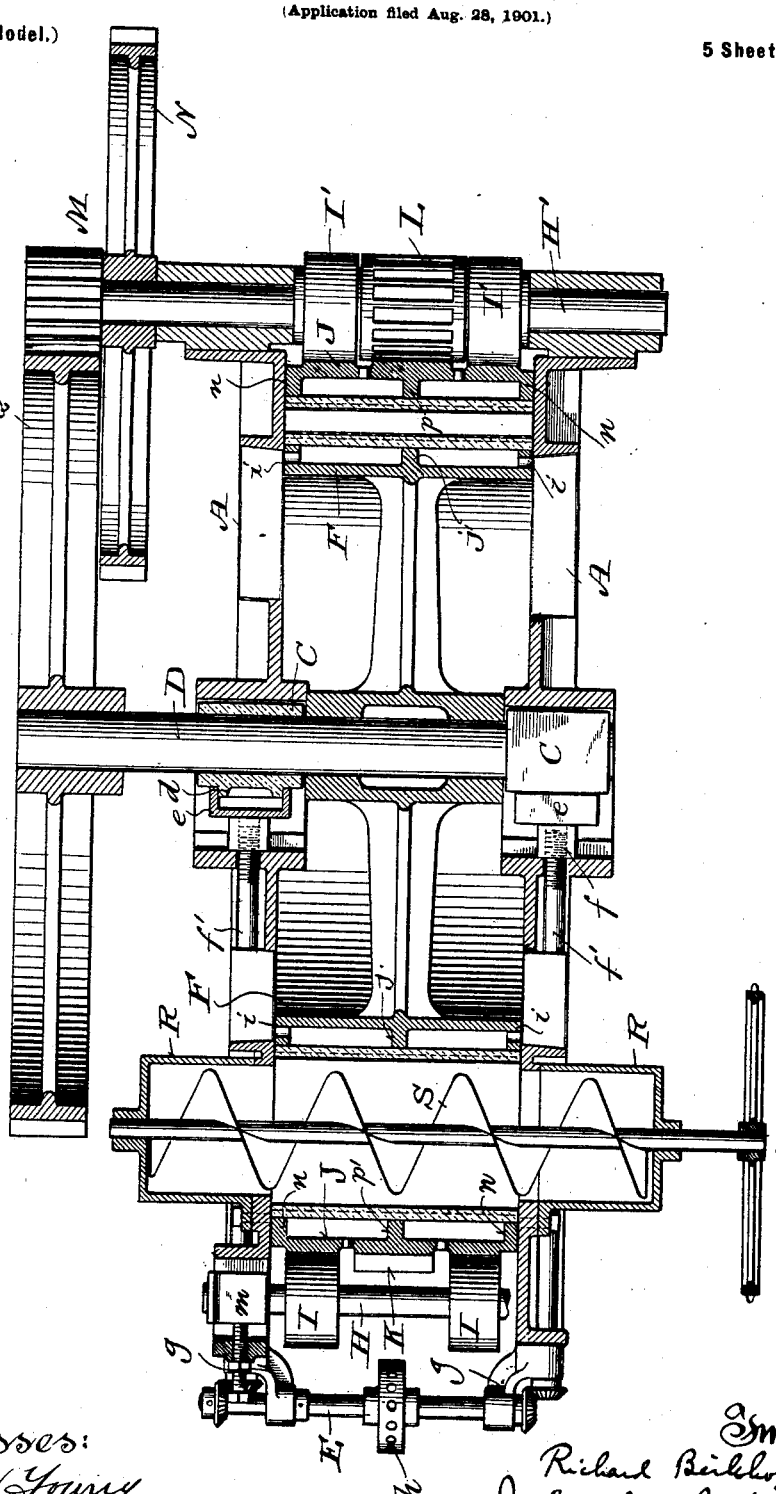

No. 714,856. Patented Dec. 2, 1902.
R. BIRKHOLZ, Dec'd.
J. W. BIRKHOLZ, Administrator.
PRESS.
(Application filed Aug. 28, 1901.)
(No Model.) 5 Sheets—Sheet 5.
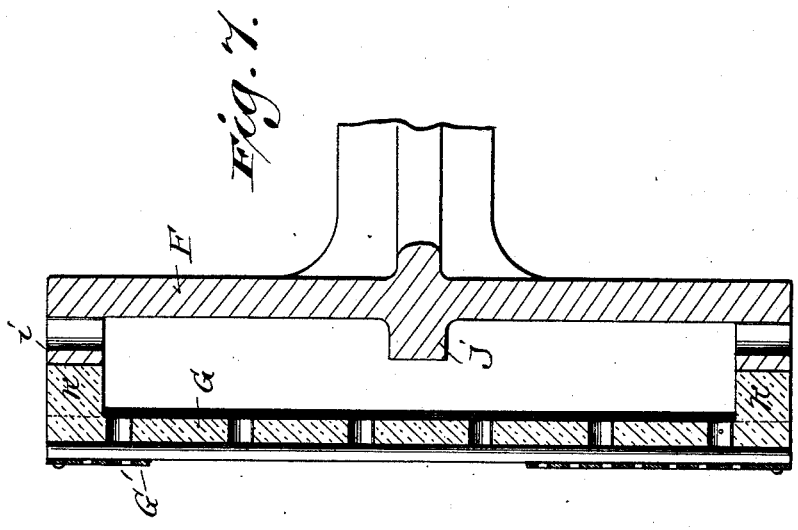
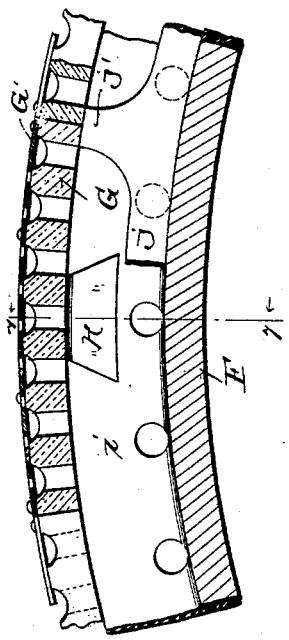
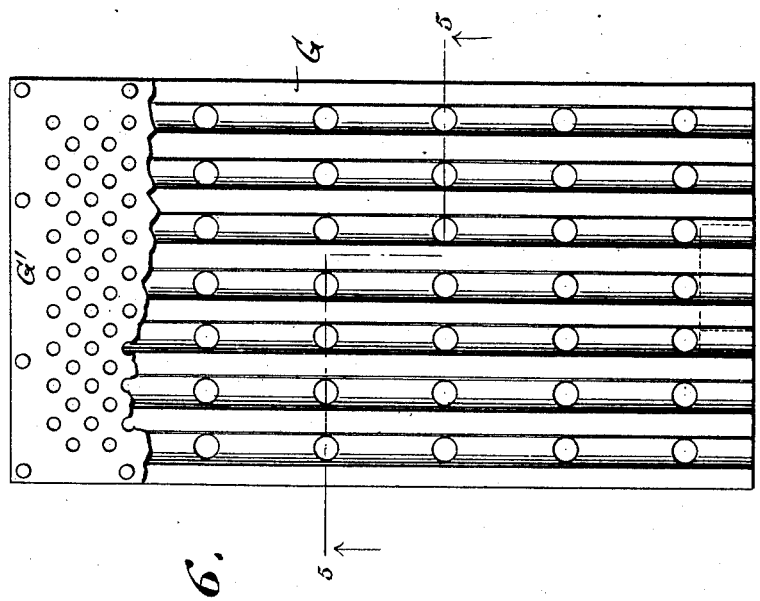
Witnesses:
Geo. W. Young.
N. E. Oliphant.
Inventor;
Richard Birkholz, deceased
Julius W. Birkholz,
Administrator.
By H. G. Underwood
Attorney

UNITED STATES PATENT OFFICE.

JULIUS W. BIRKHOLZ, OF MILWAUKEE, WISCONSIN, ADMINISTRATOR OF RICHARD BIRKHOLZ, DECEASED, ASSIGNOR TO THE GALLAND-HENNING PNEUMATIC MALTING DRUM MANUFACTURING COMPANY, OF MILWAUKEE, WISCONSIN.

PRESS.

SPECIFICATION forming part of Letters Patent No. 714,856, dated December 2, 1902.

Application filed August 28, 1901. Serial No. 73,575. (No model.)

*To all whom it may concern:*

Be it known that RICHARD BIRKHOLZ, deceased, late a citizen of the United States and a resident of Milwaukee, in the county of Milwaukee and State of Wisconsin, (of whose estate I, JULIUS W. BIRKHOLZ, of Milwaukee, Wisconsin, have been duly appointed administrator,) did invent certain new and useful Improvements in Presses; and I do hereby declare that the following is a full, clear, and exact description thereof.

The invention herein disclosed relates to presses for expressing fluid from wet masses of various kinds, especially beet-cuttings in sugar-factories, spent corn-grains in glucose and starch factories, brewery-grains, and distillery-slops, the peculiarities of construction and combination of parts embodied in said invention being hereinafter particularly set forth with reference to the accompanying drawings and subsequently claimed.

Figure 1:
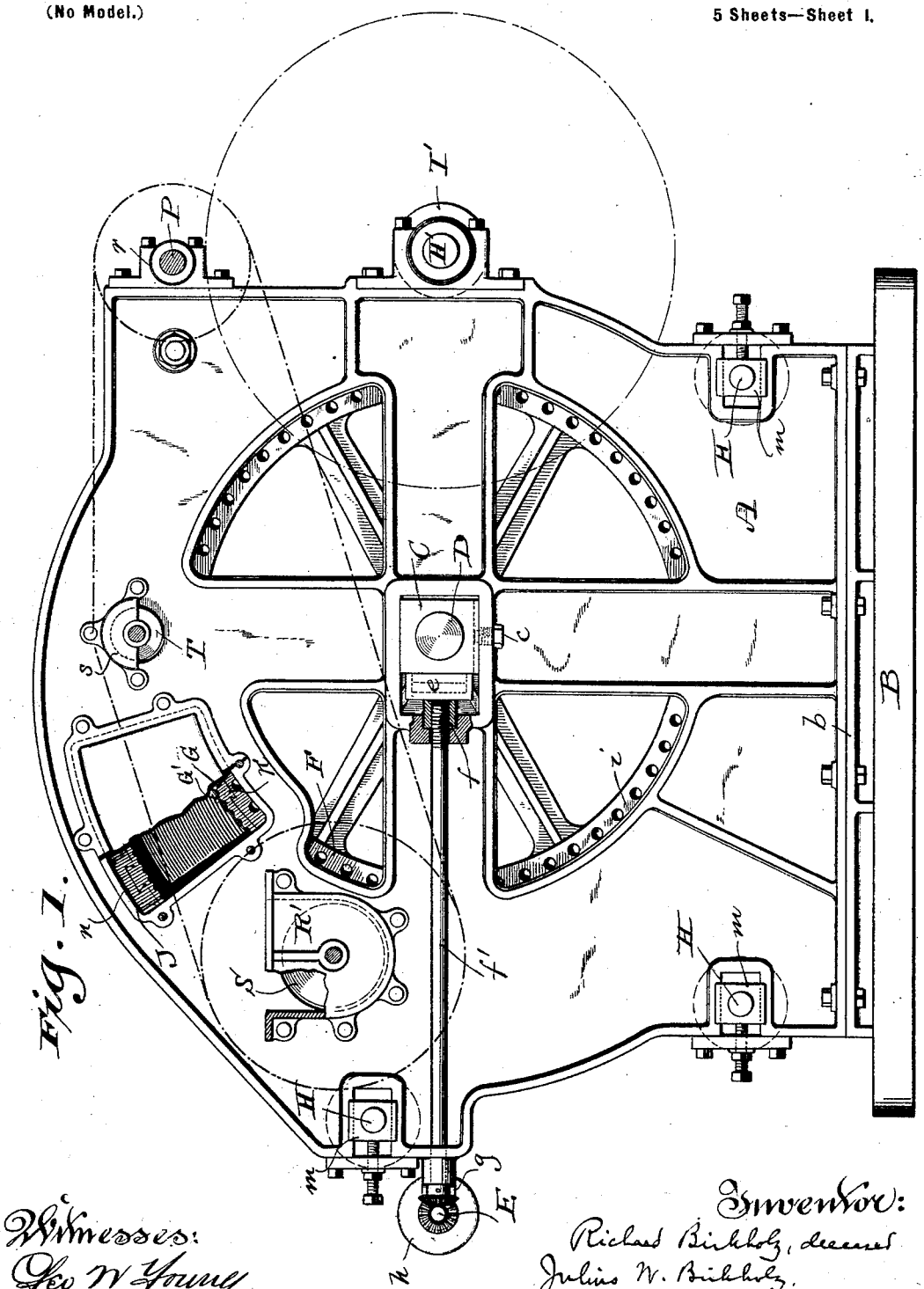
Figure 2:
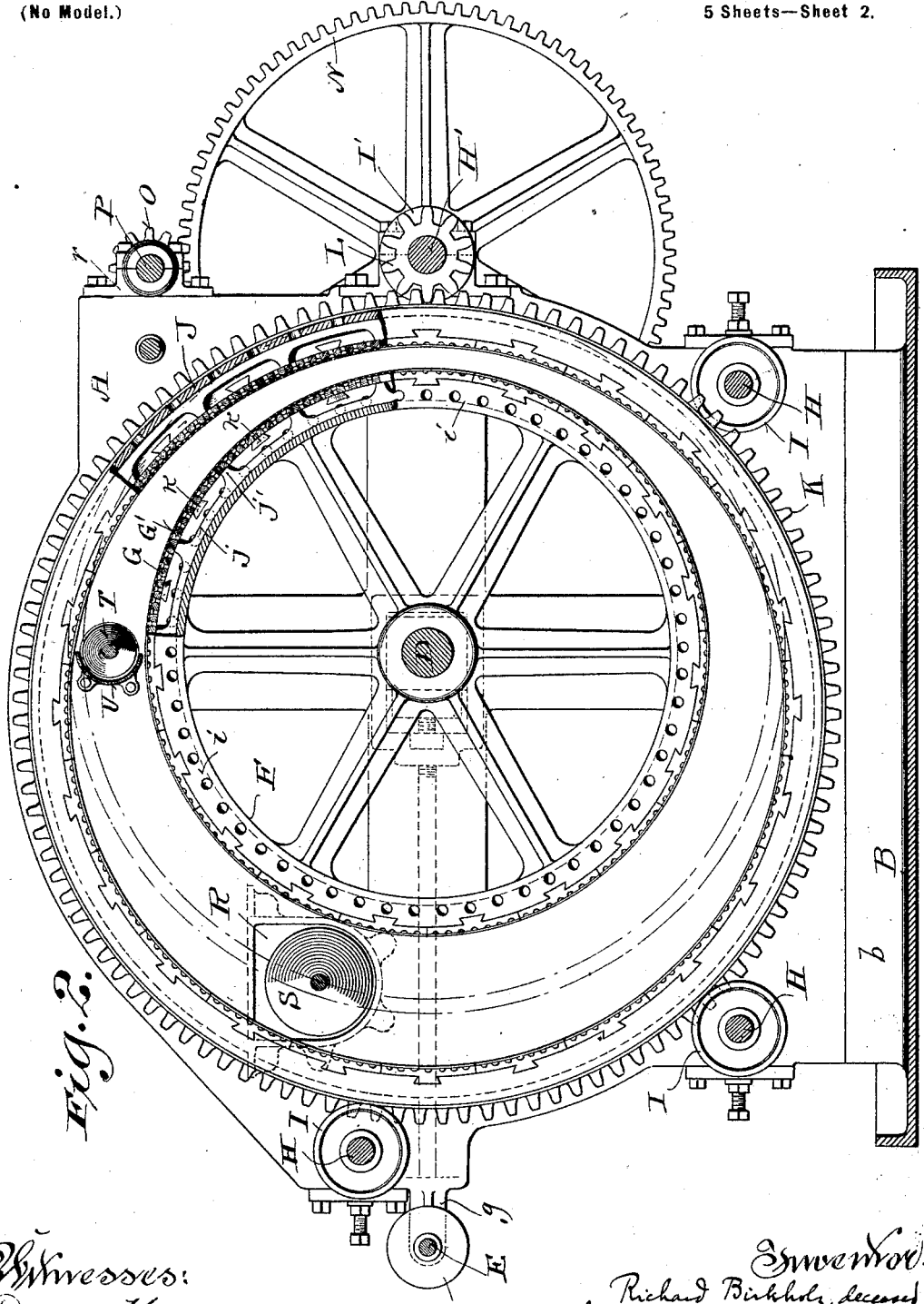
Figure 3:
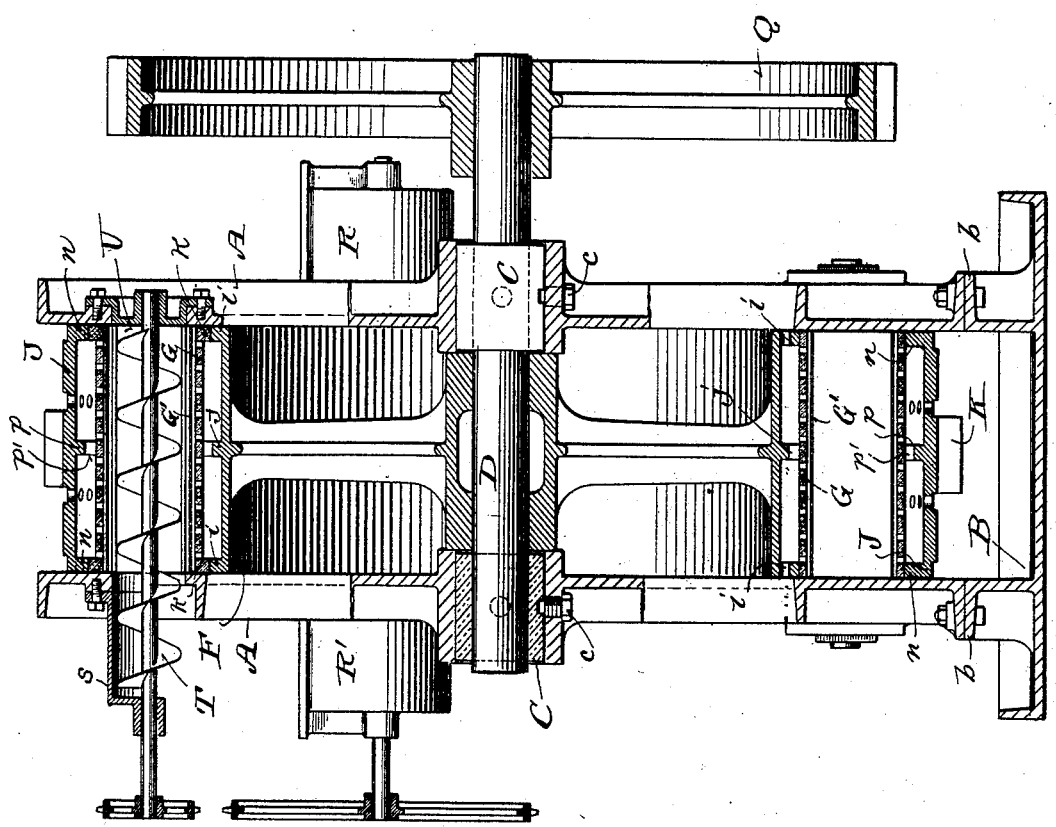

Figure 1 of the drawings represents a side elevation of a press embodying the improvements herein specified and having parts thereof broken away; Fig. 2, a longitudinal section view of the press; Fig. 3, a transverse section view; Fig. 4, a horizontal section view of said press; Fig. 5, a partly-sectional view of a portion of a drum and strainer-jacket therewith constituting part of the aforesaid press, this view being indicated by lines 5 5 in the sixth figure; Fig. 6, a plan view of a frangible strainer-section having a metallic face-plate that is shown partly broken away, and Fig. 7 a detail sectional view indicated by line 7 7 in the fifth figure.

Referring by letter to the drawings, A indicates each of a pair of parallel castings constituting side walls of the herein-described press, bottom flanges of these walls being bolted on upper flanges of ribs $b$, rising from the bottom of a preferably cast-metal receptacle B, constituting the press-base. The walls A are provided with guide-boxes for movable bearings C, pertaining to a shaft D, and an under-side groove in each bearing longitudinally of the corresponding guide is engaged by the non-threaded end of a centering-screw $c$, with which the box is provided. Each bearing is preferably provided with a rear lug $d$, engaging a cap $e$, opposing a nut $f$ on the screw-threaded end of a set-rod $f'$, for which the adjacent wall A of the press is provided with bearings, the nut being non-rotatable in an angular rear groove of the box for said bearing. The dimensions of the cap are such that a space is provided between its head and the corresponding bearing-lug, said cap being of such low resistance as to break under conditions hereinafter set forth. The end of the set-rods $f'$ farthest from the nut $f$ are miter-geared to a spindle E, having its bearings in brackets $g$ of the walls A, and fast on the spindle is a wheel $h$, provided with radial sockets for the engagement of a turning-tool. Hence it will be understood that said set-rods may be simultaneously operated to vary adjustment of nuts $f$ and regulate the position of shaft D and a drum F, having its hub fast thereon. The drum-rim is provided with outer edge flanges $i$ and a central annular rib $j$, having radial lugs $j'$ at intervals thereof, the depth of the flanges and lug portions of the rib being equal. The drum-flanges are perforated, and apertures in the walls A are adjacent to said flanges. The flanges are also provided at intervals with dovetail recesses engaged by dovetail central end lugs $k$ of segmental sections of a strainer-jacket, each of these sections being a piece of suitable frangible material G and an outer face-plate G', of thin foraminous metal, made fast on said frangible material by any suitable means. The frangible portion of each strainer-jacket section is guttered at intervals of its width, and each gutter is intercepted by a series of perforations, the several sections being arranged to have their meeting edges lap the lugs $j'$ of drum-rib $j$ aforesaid.

The walls A of the press are shown provided with guide-recesses for preferably adjustable bearings $m$, pertaining to arbors H, and rollers I on the arbors support a shell J, provided with inner edge flanges $n$, and a central rib $p$, having radial lugs $p'$ at intervals thereof, the depth of the flanges and lug portions of the rib being equal. The shell is also provided with a strainer-lining that is similar in detail to the strainer-jacket of the drum aforesaid. The lining and jacket are accessible through a normally covered aperture of suitable dimensions in one of the walls A, this aperture being shown in Fig. 1. Shell J incases the drum of the press, but is arranged eccentric thereto, and said shell is provided with peripheral cogs central thereof constituting a spur-gear K, in mesh with a pinion L on an arbor H', having bearings in connection with walls A and provided with shell-opposing rollers I'. A spur-wheel N on the arbor H' is in mesh with a driving-pinion O on a shaft P, having its bearings in brackets r, bolted to vertical edge flanges of the walls A, and another pinion M on the aforesaid arbor meshes with a spur-wheel Q on the shaft D of the drum above specified. The gearing is such that the drum and shell have positive rotation in the same direction at the same speed.

Projecting from the walls A adjacent to apertures therein are feed and overflow hoppers R R', provided with bearings for the shaft of a spiral conveyer S, that turns within the greatest width of the eccentric space between the drum-jacket and shell-lining aforesaid, and another spiral conveyer T, having its shaft arranged in bearings above the other conveyer forward of a concentric partition U between walls A, is continued through an aperture in one of the walls A under a hood s, the conveyer-shafts being provided with sprocket-wheels for engagement of a link belt, for which in practice a driving sprocket-wheel is provided on the shaft P above specified, the conveyer-shaft sprocket-wheels being shown by full lines and the link belt and driving sprocket-wheels by dotted lines. Wet material discharged from conveyer S into the press is carried on the space between the drum and shell that have slow rotation in the same direction at the same speed. Where the space between the drum and shell is contracted, the material is squeezed to express the fluid therein through the strainer-jacket of said drum and strainer-lining of said shell, the squeezed material being subsequently fed to conveyer T, by which it is disintegrated and discharged from the machine, partition U being a shunt for said material. The fluid passing through the strainer-jacket of the drum escapes through the perforations in the flanges of said drum and out through the adjacent apertures in walls A to be caught in the receptacle B, and the fluid passing through the strainer-lining of shell J escapes through the perforations in said shell into said receptacle.

The bearings for shaft D are adjustable to vary the eccentricity of the rotary drum and shell, the same result being also attainable by adjustment of the shafts carrying the shell-impinging rollers, it being desirable at times to increase the space at the greatest proximity of strainer-jacket and strainer-lining of drum and shell, respectively, thereby correspondingly reducing the space at the least proximity of said jacket and lining, the object being to prevent clogging and possible breaking of parts of the machine.

Should any hard object get squeezed in the press between the strainer-jacket of the drum and strainer-lining of the shell, the breaking of one or more of the sections of said jacket or lining will generally prevent further damage to said press, but otherwise the caps e will break under the strain to permit automatic adjustment of the aforesaid drum, and thereby provide clearance for the obstruction.

The press herein set forth may be varied somewhat in mechanical detail without departure from the invention therein involved.

Having thus described the invention of the said late RICHARD BIRKHOLZ, what is claimed as new, and desired to be secured by Letters Patent, is—

1. A press comprising a drainage-drum provided with a strainer-jacket of frangible material in independently-removable sections, a drainage-shell encompassing the drum eccentric thereto, a strainer-lining of independently-removable frangible sections in the shell, and means for rotating said drum and shell at the same speed in the same direction.

2. A press comprising an adjustable drainage-drum provided with a strainer-jacket of frangible material in independently-removable sections, a drainage-shell encompassing the drum eccentric thereto, a strainer-lining of independently-removable frangible sections in the shell, and means for rotating said drum and shell at the same speed in the same direction.

3. A press comprising a drainage-drum provided with a strainer-jacket of frangible material in independently-removable sections, an adjustable drainage-shell encompassing the drum eccentric thereto, a strainer-lining of independently-removable frangible sections in the shell, and means for rotating said drum and shell at the same speed in the same direction.

4. A press comprising an adjustable drainage-drum provided with a strainer-jacket of frangible material in independently-removable sections, an adjustable drainage-shell encompassing the drum eccentric thereto, a strainer-lining of independently-removable frangible sections in the shell, and means for rotating said drum and shell at the same speed in the same direction.

5. A press comprising a drainage-drum provided with a strainer-jacket of frangible material in independently-removable sections, a drainage-shell encompassing the drum eccentric thereto, a strainer-lining of independently-removable frangible sections in the shell, means for rotating the drum and shell at the same speed in the same direction, and low-resistance set-caps abutting drum-shaft boxes to break and permit yield of said drum to material that would not otherwise pass between said strainer-jacket and strainer-lining where they are nearest one to the other.

6. A press comprising a drum having perforated rim-flanges and an annular central rim-rib extended at intervals to form radial lugs, a strainer-jacket consisting of guttered and perforated frangible-material sections having dovetail connection with said flanges to lap the lugs of said rib, a perforated shell encompassing the drum eccentric thereto and having non-perforated flanges and a rib similar to that of said drum, a strainer-lining consisting of sections similar to those of said jacket having dovetail connection with the shell-flanges to lap the shell-rib lugs, and means for rotating said drum and shell at the same speed in the same direction.

7. A press comprising a drum having perforated rim-flanges and an annular central rim-rib extended at intervals to form radial lugs, a strainer-jacket consisting of guttered and perforated frangible-material sections having dovetail connection with said flanges to lap the lugs of said rib and faced with foraminous metal plates, a perforated shell encompassing the drum eccentric thereto and having non-perforated flanges and a rib similar to that of said drum, a strainer-lining consisting of sections similar to those of said jacket having dovetail connection with the shell-flanges to lap the shell-rib lugs, and means for rotating said drum and shell at the same speed in the same direction.

8. A press comprising a pair of parallel walls, a drainage-drum provided with perforated flanges and a strainer-jacket on the flanges, this drum being arranged to rotate between the walls to have its flange-perforations pass wall-apertures, a strainer-lined shell encompassing the drum eccentric thereto, and means for positively rotating the drum and shell at the same speed in the same direction.

9. A press comprising a pair of parallel walls, a receptacle provided with wall-supporting ribs, a drainage-drum provided with perforated flanges and a strainer-jacket on the flanges, this drum being arranged to rotate between the walls to have its flange-perforations pass wall-apertures, a strainer-lined drainage-shell encompassing the drum eccentric thereto, and means for positively rotating the drum and shell at the same speed in the same direction.

10. A press comprising a pair of parallel walls provided with guide-boxes, bearings movable in the boxes, a shaft in the bearings, caps of comparatively low resistance fitting lugs on the bearings to leave space between their heads and these lugs, set devices simultaneously adjustable in opposition to the caps, a drainage-drum fast on the shaft adjacent to wall-apertures and provided with a strainer-jacket, a strainer-lined drainage-shell encompassing the drum eccentric thereto, and means for rotating said drum and shell at the same speed in the same direction.

11. A press comprising a pair of parallel walls, a drainage-drum provided with perforated flanges and a strainer-jacket on the flanges, this drum being arranged to rotate between the walls to have its flange-perforations pass wall-apertures, a strainer-lined drainage-shell encompassing the drum eccentric thereto, feed and delivery conveyers extending through said walls, a partition between the aforesaid walls back of the delivery-conveyer, and means for positively rotating said drum and shell at the same speed in the same direction simultaneous with a drive of the conveyers.

In testimony that I claim the foregoing as the invention of the said RICHARD BIRKHOLZ, deceased, I have hereunto set my hand, at Milwaukee, in the county of Milwaukee and State of Wisconsin, in the presence of two witnesses.

JULIUS W. BIRKHOLZ,
*Administrator of the estate of Richard Birkholz, deceased.*

Witnesses:
H. G. UNDERWOOD,
B. C. ROLOFF.